United States Patent
Pedrazzini Bertolazzi

(10) Patent No.: US 7,812,490 B2
(45) Date of Patent: Oct. 12, 2010

(54) ELECTRIC MOTOR WITH TWO OPPOSITE INDEPENDENT SHAFTS

(75) Inventor: Marino Pedrazzini Bertolazzi, Madignano (IT)

(73) Assignee: Flavio Passuello, Mason Vicention (VI) (IT)

(*) Notice: Subject to any disclaimer, the term of this patent is extended or adjusted under 35 U.S.C. 154(b) by 735 days.

(21) Appl. No.: 11/568,018

(22) PCT Filed: Mar. 11, 2005

(86) PCT No.: PCT/IT2005/000134

§ 371 (c)(1),
(2), (4) Date: Oct. 17, 2006

(87) PCT Pub. No.: WO2005/101617

PCT Pub. Date: Oct. 27, 2005

(65) Prior Publication Data

US 2009/0195097 A1    Aug. 6, 2009

(30) Foreign Application Priority Data

Apr. 19, 2004  (IT)  ............................ CR2004A0008

(51) Int. Cl.
*H02K 7/10* (2006.01)
*H02K 7/108* (2006.01)
*H02K 9/06* (2006.01)

(52) U.S. Cl. ..................... 310/78; 310/75 R; 310/75 D; 310/92; 310/101

(58) Field of Classification Search .................. 310/78, 310/75 R, 114, 75 D, 92, 96, 100, 101, 112; *H02K 7/108, H02K 7/10, 9/06*

See application file for complete search history.

(56) References Cited

U.S. PATENT DOCUMENTS

| | | | | |
|---|---|---|---|---|
| 5,723,928 A | * | 3/1998 | Imai et al. | 310/114 |
| 6,373,160 B1 | * | 4/2002 | Schrodl | 310/114 |
| 6,815,857 B2 | * | 11/2004 | Akatsu | 310/114 |
| 2003/0129065 A1 | | 7/2003 | Hu | |
| 2005/0099073 A1 | * | 5/2005 | Yang | 310/75 R |

FOREIGN PATENT DOCUMENTS

| | | |
|---|---|---|
| DE | 31 10 591 A1 | 1/1982 |
| DE | 38 02 336 C1 | 4/1989 |
| DE | 3802336 C1 * | 4/1989 |
| GB | 2 073 827 A | 10/1981 |

* cited by examiner

*Primary Examiner*—Quyen Leung
*Assistant Examiner*—Michael Andrews
(74) *Attorney, Agent, or Firm*—Themis Law

(57) ABSTRACT

An electric motor with two independent output shafts connected to the rotor by coupling means working in one sense of rotation only, e.g. by means of freewheel clutches. The first freewheel works in one sense of rotation while the second freewheel works in the opposite sense. Two operating devices can be powered by the motor, simply by switching the sense of rotation; an example of use is a combined pump-compressor machine. Various embodiments are disclosed, some of them obtainable as a simple and low-cost modification of an existing motor or motor-pump assembly.

7 Claims, 2 Drawing Sheets

ELECTRIC MOTOR WITH TWO OPPOSITE INDEPENDENT SHAFTS

The invention relates to an electric motor with two opposite, independent output shafts. More in detail, the invention discloses a motor with two, opposite output shafts, aligned on the same axis, adapted to power two opposite devices in an independent and selective manner.

It is well known that the basic elements of an electric motor are a stator, a rotor and an output shaft fixed to said rotor.

As a general rule, the output shaft is accessible from one side only of the motor; some electric motors are known, however, with a shaft that extends through the whole rotor and is protruding from both sides of the motor, giving in practice two opposite power outputs.

It can be understood, however, that such a motor is not suitable to power two separate devices in an independent manner, because the two outputs are simply the opposite ends of the same shaft.

A known solution to the above stated problem is to connect each device to the motor through connecting means with a selective engagement, particularly by a freewheel clutch.

A freewheel clutch (or 'freewheel') engages in one sense of rotation only, being idle in the other; hence, two freewheels engaging in opposite senses of rotation allow to power two operating devices independently and selectively with the same motor, simply by switching the sense of rotation of the motor itself.

This solution, however, shows some drawbacks in terms of complication and overall dimensions, because components external to the electric motor are required. In some cases, expensive modifications to the operating devices are required in order to mount the freewheels.

Moreover, both the ends of the output shaft are always rotating, regardless of the operating device that is actually in use.

The purpose of the invention is to overcome the above disadvantages.

A first aim of the invention is therefore to provide an electric motor adapted itself to power two opposite operating devices, in an independent manner.

It is an aim of the invention, then, to realize an electric motor with a selectable sense of rotation and two independent opposite shafts, wherein one sense of rotation causes the rotation on one shaft, while the other remains stationary, and vice-versa.

A further aim is to provide a reliable, simple and economic motor, which is also obtainable with few modifications to existing units.

These aims are achieved by an electric motor comprising a stator and a rotor with a selectable sense of rotation, characterized in that it comprises:
 a first output shaft and a second output shaft, protruding from opposite sides of the motor itself;
 connecting means between the rotor and, respectively, said first output shaft and second output shaft;
 wherein the connecting means between the rotor and the first output shaft comprise at least first coupling means engaging in one sense of rotation only, and the connecting means between the rotor and the second output shaft comprise at least second coupling means engaging only in the opposite sense of rotation.

Said connecting means preferably comprise freewheel clutches, i.e. bearings with a mechanical engagement working only in one sense of rotation. Other bearings of known type (e.g. ball or roller bearings) are advantageously provided for the alignment of said first and second output shafts.

The bearings may be placed internally or even externally to the rotor.

According to a first, simplified embodiment, the bearings are directly mounted internally into the rotor; a preferred embodiment, however, comprises a tubular jacket associated to the rotor, and the bearings are mounted inside said jacket.

Preferably, the jacket extends outside the rotor, so that the bearings can be placed outside the rotor and the assembling is easier.

According to a further embodiment, the motor is obtained by modifying a known electric motor with an output shaft accessible from both sides, more in detail by making a hole at the ends of the original output shaft, and inserting another shaft into each of the two holes. The new shafts are connected to the original shaft of the motor by a freewheel and supporting means, e.g. a couple of ball or roller bearings.

The invention provides two opposite and independent mechanical outputs; depending on the sense of rotation of the motor, power is transferred to the first or to the second shaft, so that two operating devices can be used selectively and alternatively, with no further and specific connecting means.

The invention is now described in detail, referring to preferred embodiments by way of non limitative examples, with the help of the enclosed drawings wherein.

Figure 1:
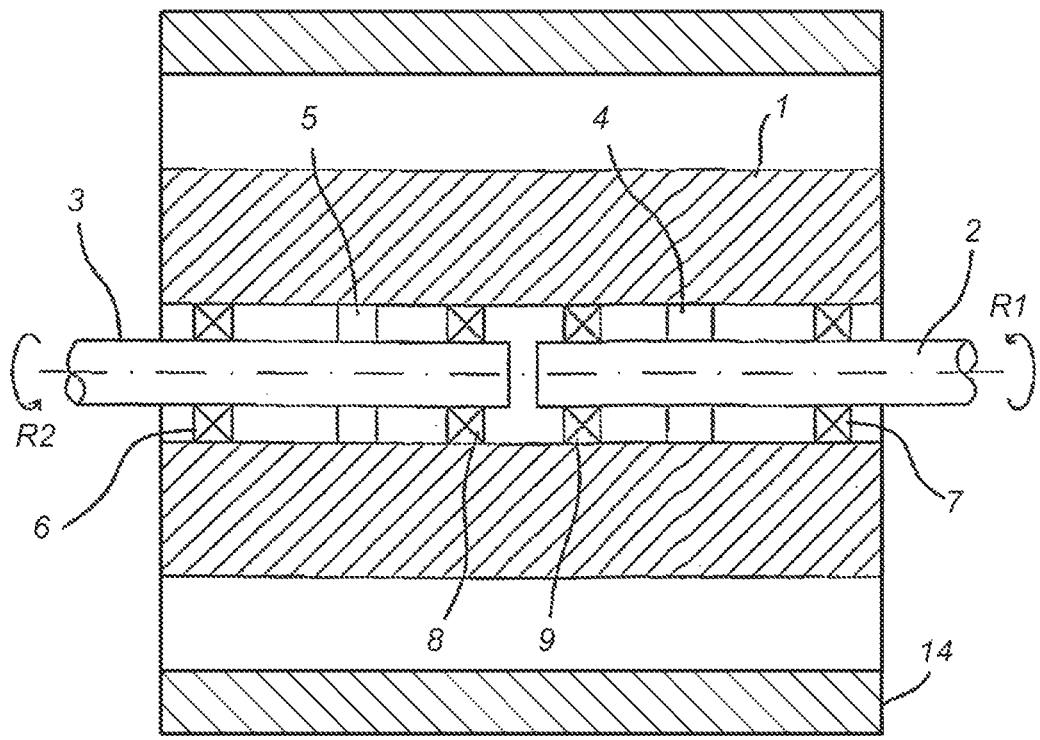
FIG. 1 is a scheme of the main components of an electric motor according to a first, simplified embodiment of the invention.

Referring now to the drawings, the invention relates to an electric motor comprising a stator 14 (not shown in FIGS. 2-4 for ease of illustration) and a rotor 1, wherein the sense of rotation of the rotor may be selected by known means provided on the motor itself.

The motor comprises a first output shaft 2 and a second, opposite output shaft 3. Said shafts 2 and 3 are protruding from opposite sides of the body of the motor.

Connecting means are provided between the shafts 2, 3 and the rotor 1; the connecting means between the shaft 2 and the rotor 1 comprise at least a first coupling device 4, acting in one sense of rotation only, e.g. a sense R1, while the connecting means between the other shaft 3 and the rotor 1 comprise at least a second coupling device 5, acting in the opposite sense of rotation, indicated as R2.

Preferably, said devices 4 and 5 are freewheel clutches, i.e. bearings made essentially by two rings with a mechanical engagement working in one sense of rotation, but idle in the opposite sense.

Ball- or roller-bearings 6, 7, 8 and 9 are also provided, for supporting the shafts 2 and 3. The bearings 8 and 9 may be replaced by a single, central roller bearing that supports both shafts 2 and 3.

Figure 2:
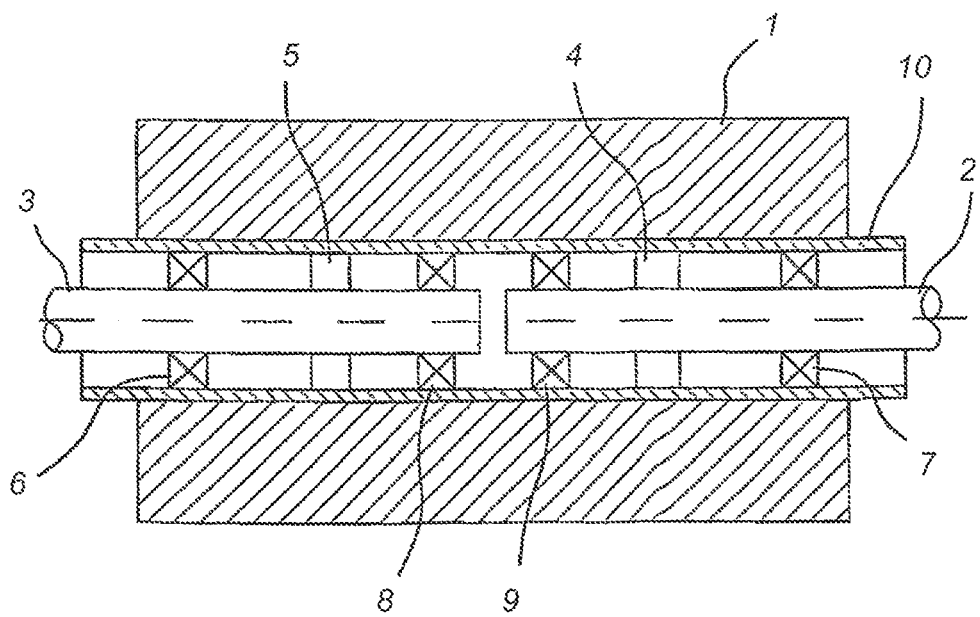
FIG. 2 is a scheme of another embodiment of the invention.

According to the embodiment of FIG. 2, a tubular jacket 10 is fixed to the rotor 1. The bearings are forced into said jacket 10, instead of being associated directly to the rotor 1.

The jacket 10 gives some other advantages: the alignment of the bearings is made easier, compared to the solution of FIG. 1 where the bearings are mounted directly into the rotor; moreover, when the motor is an inductive motor, the jacket 10 can serve as a shield to the magnetic field. For this purpose, the jacket 10 is preferably made of stainless steel or an amorphous material not containing ferrous particles.

This shielding of the bearings is advantageous, because the magnetic field may drag also the idle bearing, even if with a small torque; moreover it has been seen that the magnetic field increase the fouling due to small ferrous particles that accumulate on the bearings, and the risk of seizure is greater. The jacket 10, in this case, is useful to provide a reliable and long-life motor.

Advantageously, the jacket 10 extends outside the motor, giving in practice a further power output on one side or both sides of the motor. This further power output may be used e.g. for a cooling fan, that must be always on, regardless of the sense of rotation of the rotor 1.

Figure 3:
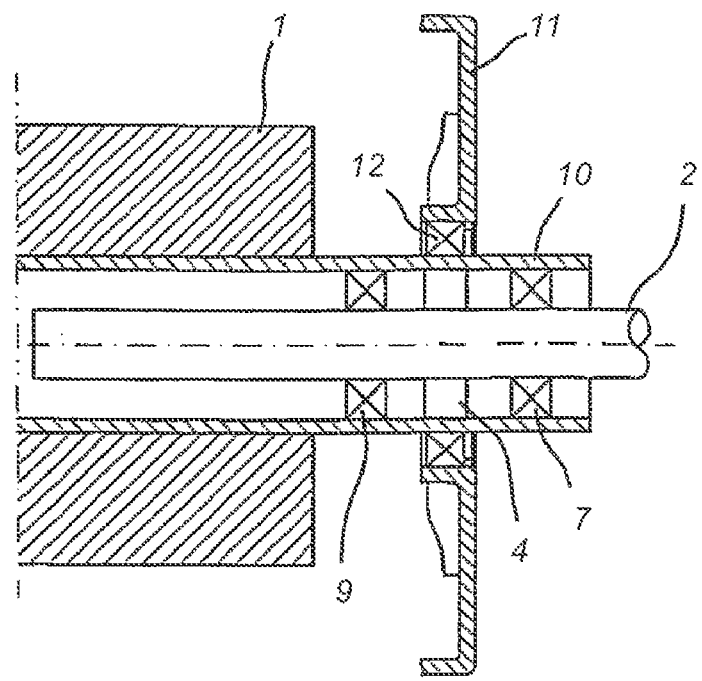
FIG. 3 is a variant of the embodiment of FIG. 2.

FIG. 3 shows a more preferred embodiment, wherein a portion of the jacket 10 extends outside the rotor 1, allowing to place the freewheels 4, 5 and the bearings 6, 7, 8, 9 outside the rotor itself.

The invention can be realized as a modification of a common electric motor available on the market; in that case, the freewheel clutches 4 and 5 are preferably mounted in correspondence to the existing bearings of the motor shaft.

FIG. 3, as an example, shows the rear part of the motor, where a rear shield 11 is provided, and a supporting bearing 12 is mounted in a seat of said shield 11. Shield 11 and bearing 12 are components of the original (unmodified) motor. The freewheel 4 is then positioned in correspondence of the bearing 12.

In a similar way, the freewheel 5 is mounted in correspondence of the other existing bearing.

It is also possible to realize the invention as a modification of a motor that already comprises an output shaft with ends protruding from both sides of the motor itself.

According to this solution (FIG. 4), two holes are made at the ends of the original motor shaft A, to provide room for the shafts 2 and 3 and their freewheel and supporting bearings.

Figure 4:
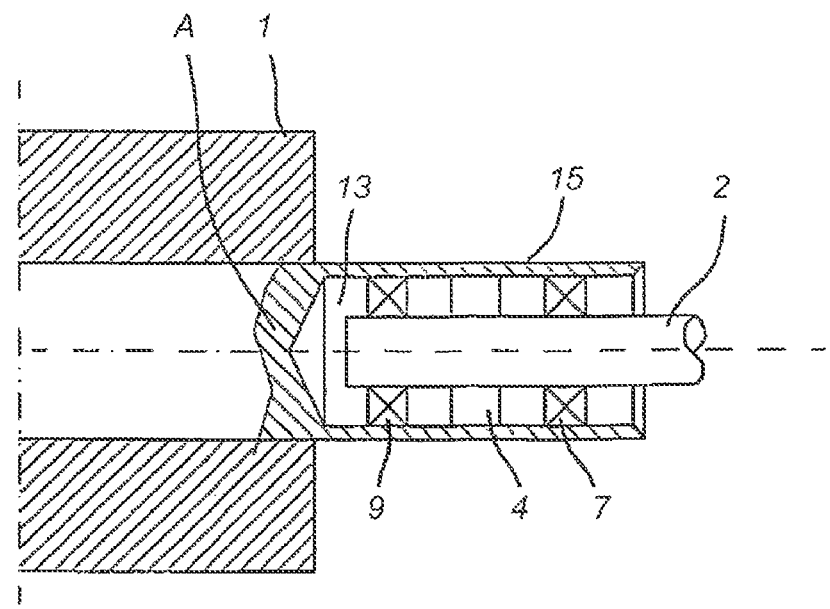
FIG. 4 is a scheme of another embodiment, obtainable as a modification of a motor providing an output shaft accessible from both sides.

Referring more in detail to FIG. 4, a hole 13 is made at one end of the original motor shaft A, and the freewheel 4 and bearings 7 and 9 are mounted in said hole 13 to support the new motor shaft 2. On the opposite side, the shaft 3 is mounted in the same way. The motor so obtained has a total of three power outputs, i.e. the first shaft 2, the second shaft 3 and a third shaft, that is the original shaft A.

It can be seen that the wall 15 of the original shaft A, defining the hole 13, has the same function as the jacket 10 of the embodiment of FIG. 3, i.e. to provide a support for the shaft 2 and 3 and the mechanical link between the bearings and the rotor 1.

The embodiment of FIG. 4 has the further advantage that the original shaft need not be replaced; another advantage is that the weight of the components is supported by the original bearings, that are expressly designed for this purpose.

Embodiments of FIGS. 3 and 4 allow to place the bearings outside the rotor 1; as stated above, this is an advantage because the construction is easier and more simple, and the bearings are not exposed to the magnetic field of the motor, when this last is an inductive motor.

The solutions of FIGS. 2 and 3, applied to a brush motor, require electrical insulation of the jacket 10; this may be achieved with a coating of a material such as Araldite® or epoxy resin. Solution of FIG. 4 does not require insulation works, because the original shaft A, which is obviously already insulated, is used.

Therefore, it can be stated that the embodiments of FIGS. 3 and 4 are generally the best solutions; those of FIGS. 1 and 2, however, may be preferred when the overall size of the motor must be kept to a minimum.

The invention can be realized starting from a conventional motor, with low cost modification to provide the room for the freewheels 4, 5 and (when provided) the jacket 10. The motor can be of any type, e.g. an inductive motor, a brush motor or a Hall-effect motor.

The invention is useful in many fields: a preferred use is the realization of combined machines for domestic, do-it-yourself or semi-professional purposes. Some examples are: a combined machine with a high pressure pump (high pressure cleaner) and a compressor; a combined machine with a compressor and a vacuum cleaner; an electric lawn mower with an air compressor, and so on.

The following example relates to the realization of the invention as a modification of a common high pressure water cleaner, comprising a displacement pump directly connected to an electric motor. Basically, the motor-pump assembly is modified according to one of the above described embodiments (or another equivalent) providing the freewheel clutches in correspondence of the existing support bearings, which are generally one on the front side (pump side) and the other on the rear side. Then, the controls of the motor are modified (when necessary) according to known technique, in order to allow the selection of the sense of rotation.

The further power output can be used e.g. for an air compressor; the original high pressure pump, hence, is converted in a combined machine equipped with a pump and a compressor powered by the same electric motor.

It is finally noted that the jacket 10 or the shaft A can be used to power a third operating machine, other than those connected to the shafts 2 and 3.

The invention claimed is:

1. An electric motor comprising:
  a stator of the motor;
  a rotor rotatable inside said stator, with a selectable sense of rotation;
  a first output shaft and a second output shaft, disposed one opposite to the other and protruding from opposite sides of said motor;
  connecting means between said rotor and, respectively, said first output shaft and said second output shaft;
  wherein said connecting means comprise at least a first freewheel clutch engaging in a first sense of rotation only, and at least a second freewheel clutch engaging only a second sense of rotation opposite to said first sense of rotation, and
  wherein a jacket housing at least a portion of the first and the second output shafts is coupled to said rotor, so that said jacket gives a further, always-on power output.

2. The electric motor as in claim 1, wherein said freewheel clutches are mounted into said jacket together with supporting bearings of said first output shaft and of said second output shaft.

3. The electric motor as in claim 2, wherein said jacket is protruding outside of the rotor and provides room for keeping said freewheels and bearings outside of the rotor.

4. The electric motor as in claim 3, wherein said freewheels are placed in correspondence of existing support bearings.

5. An electric motor comprising:
  a stator of the motor;
  a rotor rotatable inside said stator, with a selectable sense of rotation;
  a first output shaft and a second output shaft, disposed one opposite to the other and protruding from opposite sides of said motor;
  connecting means between said rotor and, respectively, said first output shaft and said second output shaft;
  wherein said connecting means comprise at least a first freewheel clutch engaging in a first sense of rotation only, and at least a second freewheel clutch engaging only a second sense of rotation to said first opposite sense of rotation, wherein said connecting means further comprise a third shaft directly associated to said rotor and extending outside said rotor on both sides, wherein a blind hole is provided at each end of said third shaft for realizing the mounting seats for said first and second output shafts and for said freewheel clutches, and wherein a wall of said third shaft defining said hole provides a jacket generating a further, always-on power output.

6. The electric motor as in claim 5, wherein supporting bearings for said first output shaft and for second output shaft are mounted in said holes at the ends of said third shaft.

7. A combined machine, comprising:

an electric motor having, a stator of the motor, a rotor rotatable inside said stator, with a selectable sense of rotation, a first output shaft and a second output shaft, disposed one opposite to the other and protruding from opposite sides of said motor, connecting means between said rotor and, respectively, said first output shaft and said second output shaft, wherein said connecting means comprise, at least a first freewheel clutch engaging in a first sense of rotation only, and at least a second freewheel clutch engaging only a second sense of rotation to said first opposite sense of rotation, wherein a jacket housing at least a portion of the first and the second output shafts is coupled to said rotor, so that said jacket gives a further, always-on power output, wherein at least a first operating device is connected to said first output shaft, and wherein a second operating device is connected to said second output shaft, so that said first and second operating devices are powered by said electric motor in a selectable and independent manner.

* * * * *